United States Patent [19]

Van Der Hardt Aberson et al.

[11] Patent Number: 4,919,007

[45] Date of Patent: Apr. 24, 1990

[54] CONTINUOUSLY VARIABLE TRANSMISSION WITH FORWARD AND REVERSE GEARING

[75] Inventors: Frederik E. C. Van Der Hardt Aberson, Eindhoven; Siebren C. Van Der Veen, Veldhoven, both of Netherlands

[73] Assignee: Van Doorne's Transmissie B.V., Tilburg, Netherlands

[21] Appl. No.: 846,839

[22] Filed: Apr. 1, 1986

Related U.S. Application Data

[63] Continuation of Ser. No. 463,301, Feb. 2, 1983, abandoned.

[30] Foreign Application Priority Data

Feb. 15, 1982 [NL] Netherlands .................... 8200564

[51] Int. Cl.$^5$ ............................................. F16H 37/08
[52] U.S. Cl. ..................................... 474/72; 475/210
[58] Field of Search .................. 74/665 GE, 689, 694, 74/700, 701, 705, 745, 793, 366, 369, 370, 665 GA; 474/72

[56] References Cited

U.S. PATENT DOCUMENTS

| | | | |
|---|---|---|---|
| 3,442,346 | 5/1969 | Winter et al. | 474/72 X |
| 4,060,012 | 11/1977 | Giacosa | 74/689 |
| 4,287,791 | 9/1981 | Numazawa et al. | 74/701 |
| 4,304,150 | 12/1981 | Lupo et al. | 74/665 GE X |
| 4,342,238 | 8/1982 | Gardner | 74/701 X |
| 4,433,594 | 2/1984 | Smirl | 74/689 |
| 4,455,888 | 6/1984 | Wayman et al. | 74/700 X |
| 4,459,872 | 7/1984 | Tibbles | 74/701 |
| 4,467,669 | 8/1984 | Kawamoto | 74/689 X |
| 4,467,670 | 8/1984 | Kawamoto | 74/689 |

FOREIGN PATENT DOCUMENTS

| | | | |
|---|---|---|---|
| 65463 | 3/1947 | Denmark | 74/689 |
| 4412 | 10/1979 | European Pat. Off. | 74/689 |
| 1477747 | 6/1977 | United Kingdom . | |
| 1553672 | 10/1979 | United Kingdom | 74/689 |

*Primary Examiner*—Dwight G. Diehl
*Attorney, Agent, or Firm*—Cushman, Darby & Cushman

[57] ABSTRACT

A transmission, in particular for a motor vehicle, provided with an input shaft which, through a drive-away clutch, drives the primary shaft of an infinitely variable V-belt transmission.

The secondary shaft of said V-belt transmission is connected with the output shaft of the transmission, whereby the input shaft and the primary shaft are disposed mutually in parallel but not coaxially, and that the primary shaft is driven by the input shaft through a reduction gear.

3 Claims, 1 Drawing Sheet

U.S. Patent   Apr. 24, 1990   4,919,007
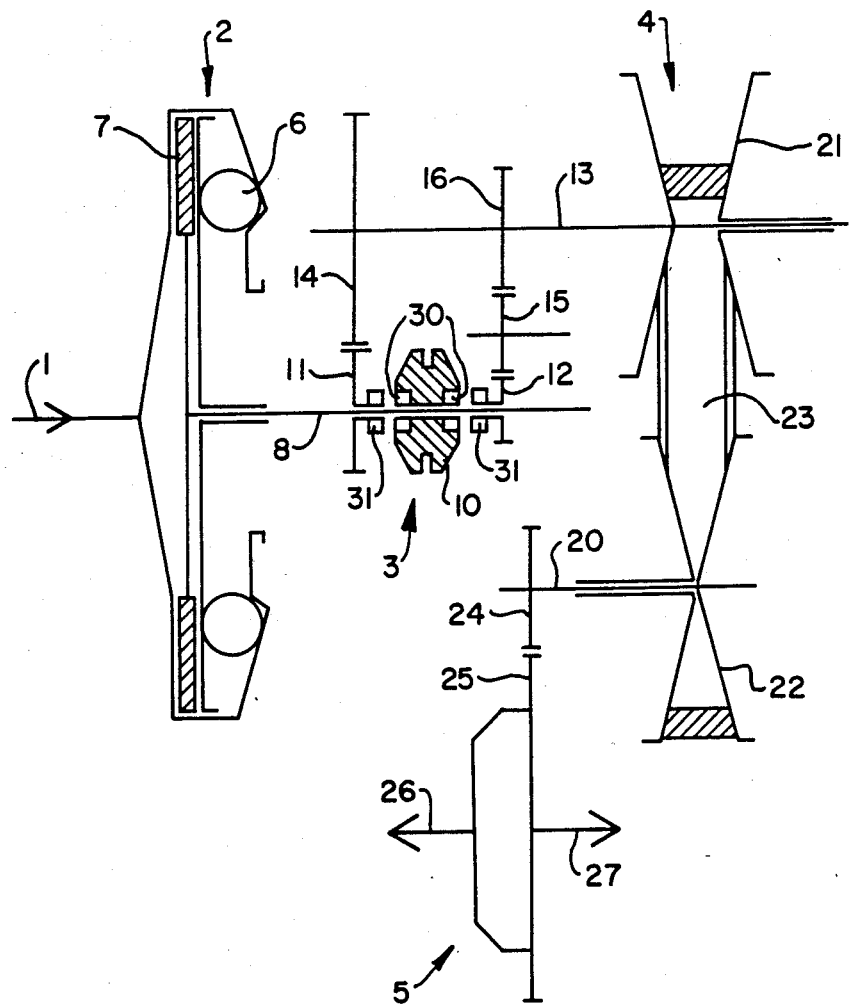

CONTINUOUSLY VARIABLE TRANSMISSION WITH FORWARD AND REVERSE GEARING

This is a continuation of application Ser. No. 463,301, filed Feb. 2, 1983, which was abandoned upon the filing hereof.

The invention relates to a transmission, in particular for a motor vehicle, provided with an input shaft which, through a drive-away clutch, drives the primary shaft of an infinitely variable V-belt transmission, whilst the secondary shaft of the said V-belt transmission is connected with the output shaft of the transmission.

Such a transmission is known from the British patent application No. 1 477 747, where a hydrodynamic torque converter acts as a drive-away clutch whose turbine wheel is coupled to the primary shaft of the V-belt transmission. Consequently, during running of the motor vehicle, the speed of rotation of the primary shaft is substantially equal to the engine speed, at which the drive-away clutch is also rotating. This may be a disadvantage, because from efficiency considerations the said speed may be not the optimum for the V-belt transmission.

Another disadvantage relates to the direction of rotation of the transmission shafts. In such a transmission it is usual that the output shaft rotates in the same direction as the input shaft when the transmission has been set to forward drive. Now if the primary shaft, and hence also the secondary shaft, of the V-belt transmission rotates in the same direction as the input shaft of the transmission, the drive arrangement provided between the secondary shaft and the output shaft of the transmission will have to be such that these two shafts rotate in the same direction. This calls for the use of a gear train either with an idler gear or a chain drive, but the latter expedient hardly permits the requisite reduction to be achieved.

It is the object of the present invention to provide a transmission in which the V-belt transmission can operate over a favourable speed range and which allows a straightforward design.

According to the invention, this is achieved by disposing the input shaft and the primary shaft mutually in parallel, but not coaxially, and causing the primary shaft to be driven by the input shaft through a reduction gear. As a result, the rotation speed of the V-belt transmission vis-à-vis that of the input shaft may be chosen arbitrarily lower, which may benefit the efficiency, depending upon the load on the transmission, in particular at light loading and high input speeds. By the use of a single step gear drive it is also ensured that the input shaft and the primary shaft rotate in opposite directions, so that the reduction between the secondary shaft and the output shaft can also be achieved by a single step reduction gear with a view to achieving that the input shaft and the output shaft of the transmission rotate in the same direction.

According to the invention, the transmission can furthermore be characterized by a foward/reverse gearchange mechanism provided with an axially movable shifting device capable of engaging a reduction gear between input shaft and primary shaft, with these two shafts rotating in opposite directions, and alternatively a reduction gear including an idler gear between input shaft and primary shaft, with these two shafts rotating in the same direction.

An important advantage of such a construction is that the forward/reverse gearchange mechanism is located close to the drive-away clutch. In a forward/reverse shift device that causes teeth to mesh through axial displacement so as to bring about a coupling, a certain freedom of rotation of at least one of the shafts must be allowed for to ensure smooth engagement, that is, to make the teeth mesh together unfailingly. Such freedom of rotation is present when the drive-away clutch is disengaged, as will be elucidated further by reference to an example.

According to another feature of the invention, the transmission may be provided with a drive-away clutch having the form of a friction plate clutch operated by means of centrifugal weights.

According to the invention, the secondary shaft of the V-belt transmission may furthermore be provided with a gear wheel driving a differential with two output shafts. In this way a straightforward construction is obtained in which the transmission is provided with four main shafts: input shaft, primary shaft, secondary shaft, output shaft (differential).

To elucidate the invention, an embodiment of the transmission will now be described by way of example with reference to the accompanying drawing.

BRIEF DESCRIPTION OF THE DRAWINGS

The single feature of the drawing shows an embodiment of the transmission according to the invention, particularly as suited for a motor vehicle.

The figure schematically shows an embodiment of the transmission with an input shaft 1, a drive-away clutch 2, a forward/reverse gearchange mechanism 3, an infinitely variable V-belt transmission 4 and a differential 5.

The drive-away clutch is represented as a centrifugal clutch with centrifugal weights 6, which at a sufficiently high rate of rotation are forced radially outwards, causing friction disc 7 to be fully engaged, so that a connection is brought about between the input shaft 1 and the shaft 8 on which the forward/reverse gearchange mechanism 3 has been mounted. This gearchange mechanism 3 is provided with a axially movable shifting device 10 which rotates along with shaft 8 and, upon displacement to the left, connects gear wheel 11 relative to shaft 8, but upon displacement to the right it connects gear wheel 12 relative to shaft 8. In consequence, depending on the position of the shifting device 10, the primary shaft 13 is driven either in the opposite direction of rotation by means of gear wheels 11 and 14 or in the same direction of rotation relative to shaft 1 by means of gear wheels 12, 15 and 16.

The infinitely variable V-belt transmission 4 is provided with a primary shaft 13 and a secondary shaft 20, each of which carries a pulley 21 and 22, respectively, over which a belt 23 has been looped. By adjustment of the pulleys, the rotation speed of the secondary shaft 20 can be modified relative to the primary shaft 13 in an otherwise known fashion.

The secondary shaft 20 is provided with a gear wheel 24 which meshes with gear wheel 25 of the differential 5 to which two output shafts 26 and 27 are connected.

When the transmission has been set to forward drive, that is to say, when the shifting device 10 has been displaced to the left, the input shaft 1 and the output shafts 26 and 27 rotate in the same direction, as is required.

The shifting device 10 which can mesh by means of the schematically shown teeth 30 with the matching teeth 31 of either gear wheel 11 or 12, is disposed on shaft 8 which can rotate freely with a low rotational inertia when the drive-away clutch 2 has been disengaged. By this means the smooth engagement of the gearchange mechanism is greatly improved, because the teeth 30 and 31 are easily slid into mesh.

We claim:

1. A transmission comprising a centrifugal drive away clutch means having an input shaft, a forward and reverse reduction gear means connecting the input shaft to a primary shaft of an infinitely variable V-belt transmission such that the input shaft and primary shaft are arranged in a spaced parallel relationship, said reduction gear means being provided with a shifting means slidable on a shaft coaxially arranged with the input shaft, to shift the gearing means from forward to reverse position, the reduction gear means including a first gear of a forward gear train and a first gear of a reverse gear train, said first gears of said gear trains being selectively engageable by said slidable shifting means and being mounted on said coaxial shaft for rotation relative thereto whereby said coaxial shaft rotates freely with low inertia when said drive away clutch is disengaged, the V-belt transmission having a secondary shaft coupled to the primary shaft by the V-belt and further connected to an output shaft of the transmission.

2. In a motor vehicle transmission having a rotary input shaft and a rotary output: a rotatable first shaft; a centrifugal drive-away clutch connected between said input shaft and said first shaft such that said first shaft is driven when said clutch is engaged and is freely rotatable when said clutch is disengaged; an infinitely variable V-belt transmission assembly having a primary pulley rotatable with a primary shaft which is parallel to and offset from said input shaft, a secondary pulley rotatable with a secondary shaft connected to said output and a V-belt coupling the pulleys; a shiftable forward and reverse gear system for selectively connecting said first shaft to said primary shaft to drive said primary shaft in forward and reverse modes, said gear system including a shifting device carried by and rotatable with said first shaft and axially slidable along said first shaft between two positions, said shifting device having gear teeth which in one axial position of said device mesh with gear teeth on a first gear of a forward gear train in said system to drive said primary shaft in one direction and said shifting device having gear teeth which in the other axial position of said device mesh with different gear teeth on a first gear of a reverse gear train in said system to drive said primary shaft in an opposite direction, said first gears of said gear trains being mounted on said first shaft for rotation relative thereto whereby said first shaft rotates freely with low inertia when said drive-away clutch is disengaged.

3. A transmission for a motor vehicle, having a drive-away clutch with an input shaft and operating by means of centrifugal weights, an infinitely variable V-belt transmission with a primary shaft and a secondary shaft coupled to the primary shaft by a V-belt, a reduction gear assembly between the clutch and the V-belt transmission, the input shaft and the primary shaft being coupled through the clutch and the gear assembly, said secondary shaft being connected to an output shaft of the transmission, characterized in that the input shaft and the primary shaft are parallel and spaced and that a forward/reverse mechanism with an axially movable shifting device is located in the reduction gear assembly, said shifting device sliding along a driving gear shaft coaxial with the input shaft; said shifting device being drivingly connected with said driving gear shaft and provided with teeth selectively engageable with teeth of a first gear of a forward gear train and with teeth of a first gear of a reverse gear train, said first gears of said gear trains being mounted on said driving gear shaft for rotation relative thereto whereby said driving gear shaft rotates freely with low inertia when said drive-away clutch is disengaged, and said gear trains connecting the driving gear shaft with the primary shaft of the V-belt transmission.

* * * * *